United States Patent
Allen, Jr. et al.

(10) Patent No.: US 8,375,459 B2
(45) Date of Patent: Feb. 12, 2013

(54) FREQUENCY BASED AGE DETERMINATION

(75) Inventors: Lloyd W. Allen, Jr., Cary, NC (US);
Travis M. Grigsby, Austin, TX (US);
Jana H. Jenkins, Raleigh, NC (US);
Steven M. Miller, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 943 days.

(21) Appl. No.: 12/410,551

(22) Filed: Mar. 25, 2009

(65) Prior Publication Data

US 2010/0251336 A1    Sep. 30, 2010

(51) Int. Cl.
*H04N 7/16*    (2011.01)

(52) U.S. Cl. ......... 726/30; 726/2; 726/3; 726/4; 726/27; 726/28; 709/216; 709/226; 709/229; 705/51; 725/25; 725/28; 600/300; 600/559

(58) Field of Classification Search .......... 709/216, 709/226, 229; 726/2–4, 27–30; 705/51; 725/25, 28

See application file for complete search history.

(56) References Cited

U.S. PATENT DOCUMENTS

| | | | | |
|---|---|---|---|---|
| 5,928,160 | A * | 7/1999 | Clark et al. | 600/559 |
| 6,195,698 | B1 * | 2/2001 | Lillibridge et al. | 709/225 |
| 6,196,460 | B1 * | 3/2001 | Shin | 235/380 |
| 6,379,314 | B1 * | 4/2002 | Horn | 600/559 |
| 6,484,182 | B1 * | 11/2002 | Dunphy et al. | 700/231 |
| 6,662,230 | B1 * | 12/2003 | Eichstaedt et al. | 709/229 |
| 6,829,939 | B2 * | 12/2004 | Kurakata et al. | 73/585 |
| 6,961,858 | B2 * | 11/2005 | Fransdonk | 726/29 |
| 7,020,635 | B2 * | 3/2006 | Hamilton et al. | 705/51 |
| 7,080,049 | B2 * | 7/2006 | Truitt et al. | 705/75 |
| 7,090,128 | B2 * | 8/2006 | Farley et al. | 235/384 |
| 7,107,462 | B2 * | 9/2006 | Fransdonk | 713/193 |
| 7,150,045 | B2 * | 12/2006 | Koelle et al. | 726/26 |
| 7,370,208 | B2 * | 5/2008 | Levin et al. | 713/182 |
| 7,543,330 | B2 * | 6/2009 | Garbow et al. | 726/2 |
| 7,564,979 | B2 * | 7/2009 | Swartz | 381/60 |
| 7,587,502 | B2 * | 9/2009 | Crawford et al. | 709/229 |
| 7,606,915 | B1 * | 10/2009 | Calinov et al. | 709/229 |
| 7,711,586 | B2 * | 5/2010 | Aggarwal et al. | 705/5 |
| 8,060,916 | B2 * | 11/2011 | Bajaj et al. | 726/3 |
| 2002/0032869 | A1 * | 3/2002 | Lamberton et al. | 713/200 |
| 2002/0126859 | A1 * | 9/2002 | Ullrich | 381/104 |

(Continued)

OTHER PUBLICATIONS

Idology Inc., "Verify Age", http://www.idology.com/age.html (Obtained Feb. 5, 2009).

(Continued)

*Primary Examiner* — Mamon Obeid
(74) *Attorney, Agent, or Firm* — DeLizio Gilliam, PLLC

(57) ABSTRACT

Human ability to perceive higher audio frequencies diminishes with age. Functionality can be implemented to use a combination of audio tones with varying frequencies to identify an age range to which a user belongs and accordingly control access to age dependent access controlled information and services. The user's ability to perceive one or more audio tones in the combination of audio tones depends on the user's age. Thus, different users, depending on the users' age, may perceive the same combination of audio tones differently. Such an age verification system based on human perception of audio tones can minimize the need for identification cards and a reliance on the user providing accurate age information. This can prevent the user from misinterpreting his/her age to access the age dependent access controlled information and can ensure that only an authorized user gets access to the age dependent access controlled information.

13 Claims, 5 Drawing Sheets

U.S. PATENT DOCUMENTS

| | | | |
|---|---|---|---|
| 2003/0128676 A1* | 7/2003 | Lee | 370/328 |
| 2004/0123160 A1* | 6/2004 | Mizrah | 713/202 |
| 2005/0137860 A1* | 6/2005 | Nam | 704/205 |
| 2005/0256810 A1* | 11/2005 | Lund | 705/400 |
| 2007/0230899 A1* | 10/2007 | Shiiyama | 386/75 |
| 2008/0034396 A1* | 2/2008 | Lev | 725/118 |
| 2008/0059198 A1* | 3/2008 | Maislos et al. | 704/273 |
| 2008/0097957 A1* | 4/2008 | Hoover et al. | 707/1 |
| 2009/0013414 A1* | 1/2009 | Washington et al. | 726/32 |
| 2009/0055193 A1* | 2/2009 | Maislos et al. | 704/273 |
| 2009/0077645 A1* | 3/2009 | Kottahachchi | 726/9 |
| 2010/0146535 A1* | 6/2010 | Wieser | 725/28 |

OTHER PUBLICATIONS

Mosquito Ringtones, "What is the Mosquito Ringtone?", http://www.freemosquitoringtones.org/ (Obtained Feb. 5, 2009).

* cited by examiner

FREQUENCY BASED AGE DETERMINATION

BACKGROUND

Embodiments of the inventive subject matter generally relate to the field of electronic age approximation, and more particularly, to frequency based age determination.

Human ability to perceive higher audio frequencies diminishes with age. For example, only very young children may hear audio frequencies close to the human auditory upper limit (20 KHz). A reasonable estimate of a person's age can be determined based on the person's ability to perceive audio tones at different frequencies.

SUMMARY

Embodiments include a method that detects a request to access an age dependent access controlled resource hosted by at least one server. Access to the age dependent access controlled resource is limited to users within a predetermined age range. A set of one or more audio tones is presented on a device, wherein human ability to perceive each of the set of one or more audio tones is age dependent. It is determined that at least a first of the set of one or more audio tones could not be perceived. The first audio tone corresponds to the predetermined age range. The request to access the age dependent access controlled resource hosted by the at least one server is denied based on the determination that at least a first of the set of one or more audio tones could not be perceived.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences, and computer program products that embody techniques of the present inventive subject matter. However, it is understood that the described embodiments may be practiced without these specific details. For instance, although examples refer to granting access to an age restricted web application such as a website and a chat room, techniques for electronic age verification as described below can be implemented in mobile phone based applications and mobile phone and landline phone based voice communication. Techniques for determining a range of a user's age and accordingly blocking or granting access to resources as described below may also be implemented in handheld devices (e.g., at a liquor store). In other instances, well-known instruction instances, protocols, structures, and techniques have not been shown in detail in order not to obfuscate the description.

Age verification systems based on human perception of audio frequencies can be used to control access to applications and services with age dependent access controlled information. The age verification systems can use a combination of audio tones to identify an age range to which a user belongs. The user's ability to perceive one more audio tones in the combination of audio tones depends on the user's age. Thus, different users, depending on the users' age, may perceive the same combination of audio tones differently. The audible (or non-audible) audio tones can be mapped to a visual image that can help identify the user's approximate age. Such an age verification system based on human perception of audio tones can minimize the need for identification cards, which can be easily forged. An age verification system that does not rely on a user providing accurate information can prevent a user from misinterpreting his/her age to access the age dependent access controlled information. This can ensure that only an authorized user gets access to the age dependent access controlled information.

Figure 1:
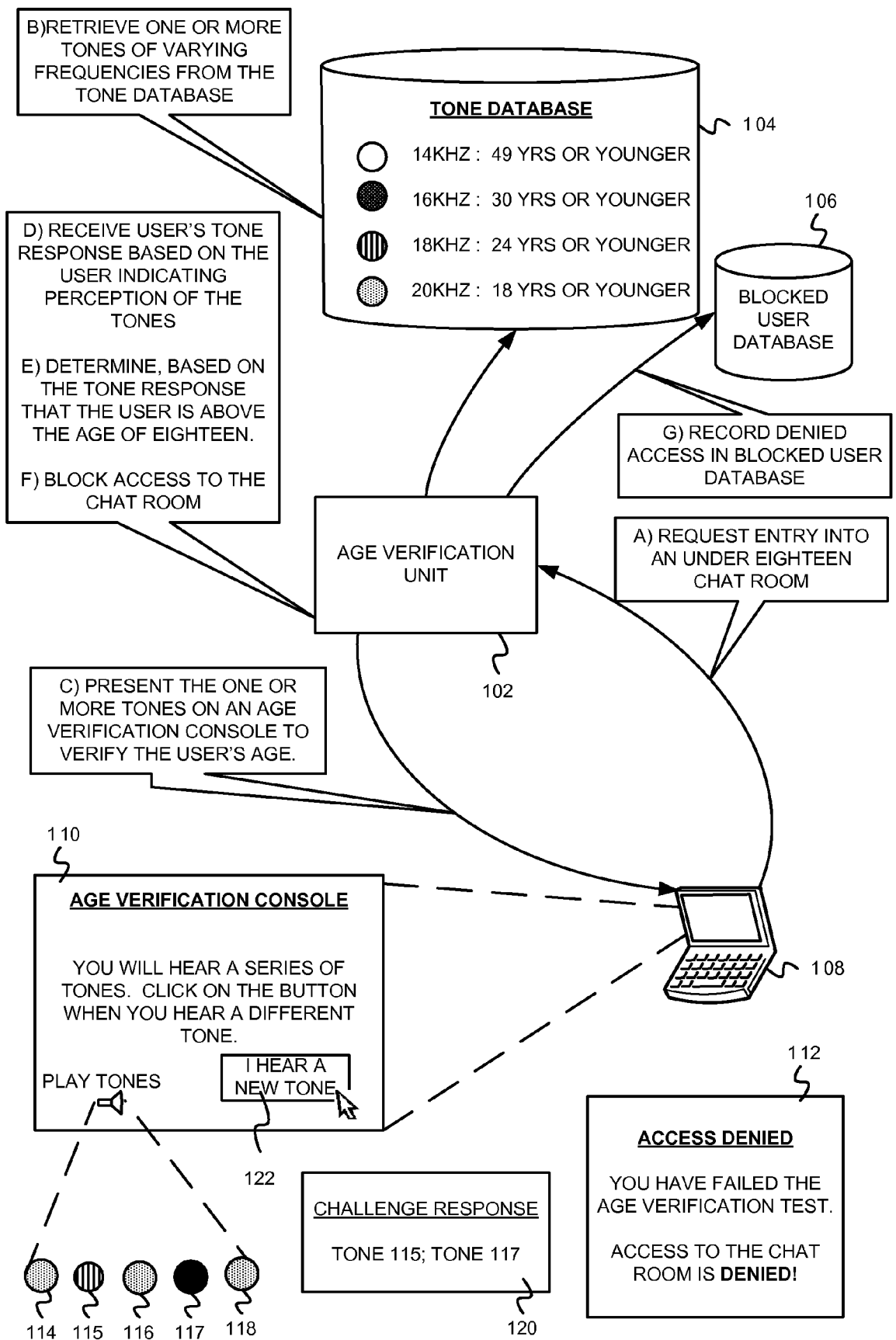
FIG. 1 is an example conceptual diagram illustrating electronic age verification based on a perception of audio tones.

FIG. 1 is an example conceptual diagram illustrating electronic age verification based on a perception of audio tones. FIG. 1 depicts an age verification unit 102 in communication with a tone database 104 and a blocked user database 106.

At stage A, the age verification unit 102 receives a request to access an age dependent access controlled resource. In FIG. 1, the age dependent access controlled resource is a chat room for children under the age of eighteen. The age verification unit 102 may receive a request via the Internet and a user's personal computer 108 or a mobile phone. In some implementations, the age verification unit 102 may intercept all initial communications (e.g., login requests) to the chat room and block access until the age verification unit 102 verifies the user's age.

At stage B, the age verification unit 102 accesses the tone database 104 and retrieves one or more audio tones of varying frequencies. The tone database 104 may comprise audio files, each audio file comprising an audio tone at a pre-defined frequency. The tone database 104 may also implement functionality to randomly generate a set of audio tones on request. The age verification unit 102 may retrieve a random set of audio tones irrespective of the age restrictions on the age dependent access controlled chat room. Alternately, the age verification unit 102 may retrieve audio tones based on the age restrictions to determine the user's age and to determine whether the user's age falls within an acceptable age range specified by the age dependent access controlled chat room. For example, the age verification unit 102 may select a set of four audio tones (from the tone database 104)—one for each age group and determine a lower limit on the user's age based on the user's perception of the selected audio tones. As another example, instead of determining the user's approximate age, the age verification unit 102 may determine an approximate age range or threshold (e.g., whether the user is below the age of eighteen). Therefore, the age verification unit 102 may select and present a larger number of high frequency audio tones. In FIG. 1, the age verification unit 102 selects five audio tones 114, 115, 116, 117, and 118 from the tone database 104, three of which can be heard only by children below the age of eighteen (tones 114, 116, and 118).

At stage C, the age verification unit 102 transmits a challenge with the set of retrieved audio tones 114-118. The age verification unit 102 may present the challenge on an age verification console 110. The age verification unit 102 concatenates the five audio tones 114, 115, 116, 117, and 118, and generates a single audio file. The age verification unit 102 may direct a web browser or age verification plug-in on the client 108 to present the audio file on the age verification console 110. The age verification unit 102 also presents, on the age verification console 110, a message indicating that the user should click on a button 122 when the user perceives a different audio tone. In some implementations, the age verification unit 102 may present the audio tones in an increasing order of audio frequency. For example, the age verification unit 102 may first present an audio tone with a low frequency and present subsequent audio tones with progressively increasing audio frequencies. In another implementation, the age verification unit 102 may present the audio tones in a varying order as illustrated in FIG. 1 (tones 114-118).

At stage D, the age verification unit receives the user's response to the challenge ("challenge response 120") presented at stage C. The challenge response 120 indicates the user's perception of one or more of the presented set of audio tones. When the user perceives a new audio tone, the user clicks on button 122. The web browser or age verification client plug-in records tone information (e.g., a tone identification number, tone frequency, a reference to the audio tone, etc.) associated with the perceived audio tone. The web browser also transmits the recorded tone information to the age verification unit 102. In some implementations, the web browser (e.g., on the user's personal computer 108 or mobile phone) may generate the challenge response 120 indicating the audio tones perceived by the user. As shown in FIG. 1, the challenge response 120 indicates that the user responded to tones 115 and 117.

In some implementations, the web browser may not have access to the tone information and may not be able to identify the audio tones perceived by the user. Therefore, the web browser may indicate a time instant at which a mouse click (or other indication of user input) was detected. The web browser may record the time instant as an offset to the time at which the audio file, comprising the set of audio tones, started playing. The age verification unit 102 may receive the challenge response comprising a set of one or more time instants corresponding to the user's perception of the audio tones. The age verification 102 may compare the challenge response 120 with the set of audio tones presented to the user and determine tone information associated with each of the perceived tones (e.g., tones 115 and 117). The age verification unit 102 may also determine tone information for audio tones (e.g., tones 114, 116, and 118) that the user could not recognize.

At stage E, the age verification unit 102 maps the perceived and non-perceived audio tones to create a visual image and determines that the user is above the age of eighteen. The age verification unit 102 may determine that the user is above the age of eighteen because the user was unable to hear the three audio tones 114, 116, and 118, which children under the age of eighteen can perceive. Because the user was able to perceive tones 115 and 117, the age verification unit 102 determines that the user is between the age of nineteen and twenty-four.

At stage F, the age verification unit 102 blocks access to the chat room. In addition to presenting an access denied screen 112, the age verification unit 102 can also record the blocked user's information in the blocked user database 106 (see stage G). User information can include a user login name, an internet protocol (IP) address associated with the chat room, a personal computer 108 serial number, etc. If the user uses a mobile phone to access an age dependent access controlled application and is blocked, the age verification unit 102 may also record a mobile phone number and a mobile phone serial identification number in the blocked user database 106. The blocked user database 106 may also store a number (e.g., in the form of a counter variable) of consecutive denied requests to access the age dependent access controlled application.

Although FIG. 1 describes operations for controlling access to a chat room, the operations of FIG. 1 may be implemented to control access to other age dependent access controlled resources such as online communication environments, online games, virtual worlds, geographic regions within the virtual worlds, online message forums, bulletin boards, etc. The age verification operations of FIG. 1 may also be implemented to control access to age dependent access controlled websites, parts of websites with age dependent access controlled information, and web applications. In some implementations, a user may implement a local age verification unit, on an electronic device such as a laptop or a mobile phone. The user may configure age restrictions to receive communications from other users within a specified age group. For example, a user may configure age restrictions to prevent other users outside a first age group from viewing the user's blog. As another example, the user may set age restrictions on his/her mobile phone to prevent callers within a second age group from contacting him/her. In some implementations, a user may configure age restrictions to control access to local resources (e.g., documents, applications, images, etc. on a local machine). For example, an age verification unit on the local machine may generate audio tones (or retrieve the audio tones from a server) if the age verification unit detects a request to access the restricted local resource.

Figure 2:
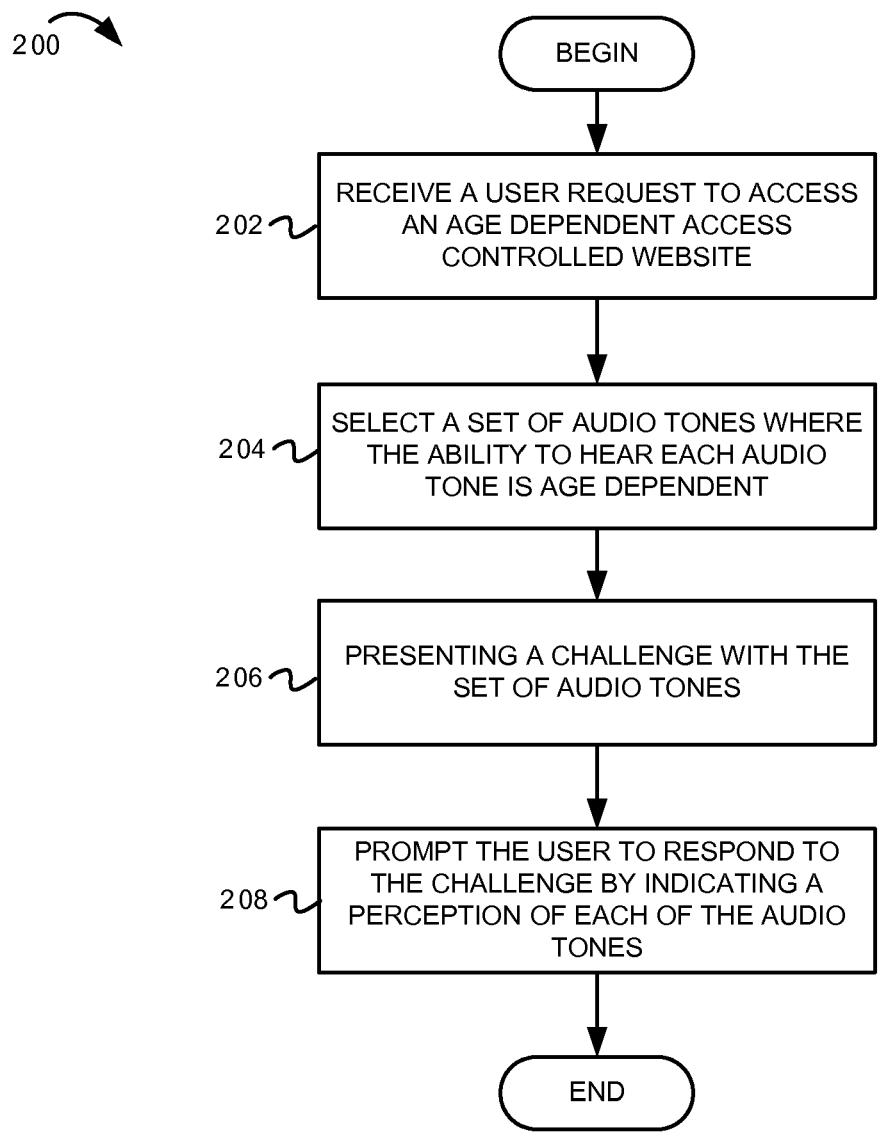
FIG. 2 is a flow diagram illustrating example operations for generating an audio tone based challenge for electronic age verification.

FIG. 2 is a flow diagram illustrating example operations for generating an audio tone based challenge for electronic age verification. The flow 200 begins at block 202.

At block 202, a user request to access an age dependent access controlled website is received. The request may be in response to the user clicking on a link to a website, clicking on a restricted section of the website, accessing an age dependent access controlled application, etc. For example, operations to verify the user's age may be triggered when the user tries to purchase alcohol online, log into an age dependent access controlled chat room, or access a website with adult content. The flow continues at block 204.

At block 204, a set of audio tones is selected. The ability to perceive each tone of the set of audio tones is age dependent. For example, only humans below the age of eighteen may be able to hear an audio tone at 20 KHz. The set of audio tones may also be generated in response to the received user request. In some implementations, the set of audio tones may be selected at random. In other implementations, the set of audio tones may be selected based on age restrictions associated with the age dependent access controlled website, to determine whether the user belongs to a specific age group. For example, to determine whether the user is a minor, only audio tones heard by humans below the age of eighteen may be selected. As another example, an online wine store may present more audio tones (e.g., 80% of the selected audio tones) that are heard by minors as compared to audio tones heard by adults, to focus mainly on preventing minors from making online wine purchases. The flow continues at block 206.

At block 206, a challenge is presented with the set of audio tones. The set of audio tones may be concatenated to form a single audio file. A server hosting the age dependent access controlled website may present the audio file comprising the set of audio tones on an age verification console. The user may play the audio file from the server or may download the audio file to a client (e.g., mobile phone, laptop, etc.) and play the audio file on the client. Alternately, the server may also transmit the audio file to the client along with audio tone information. A web browser on the client may implement functionality to present an interface for the age verification console. An age-verification plug-in on the client ("client plug-in") may generate the age verification console and present the audio tones after the client receives the audio tones from the server. The client plug-in may also download or generate audio tones based on instructions from the server. For example, the server may identify ten audio tones using ten tone identification numbers and direct the client plug-in to retrieve the audio tones and present the audio tones on the age verification console. The client plug-in may download the audio tones from a tone database, concatenate the audio tones to form an audio file, and present the audio file on a pre-configured age verification console.

However, in some implementations, the client may not comprise an age-verification plug-in and may be oblivious to the age verification process implemented on the server. The client may receive instructions from the server (e.g., in a file) describing how the client should generate and present the age verification console. The client may receive the audio file comprising one or more audio tones and present the audio file in accordance with the instructions transmitted by the server. The flow continues at block 208.

At block 208, the user is prompted to respond to the challenge (presented at block 206) by indicating a perception of each of the audio tones in the audio file. The user may indicate a perception of the audio tones by clicking on a button on the age verification console. The user may also indicate a perception of the audio tones by touching a button or other graphical object on a touch screen, touching stylus to a screen, pressing a pre-defined key on a keyboard or a keypad, speaking an indication when an audio tone is perceived, etc. Also, in some implementations, the client plug-in or web browser may comprise functionality to present the challenge and prompt the user to respond to the challenge with minimal direction from the server. In other implementations, the client may receive, from the server, instructions for presenting the challenge, prompting the user to respond to the challenge, and transmitting the user's response to the challenge. From block 208, the flow ends.

Figure 3:
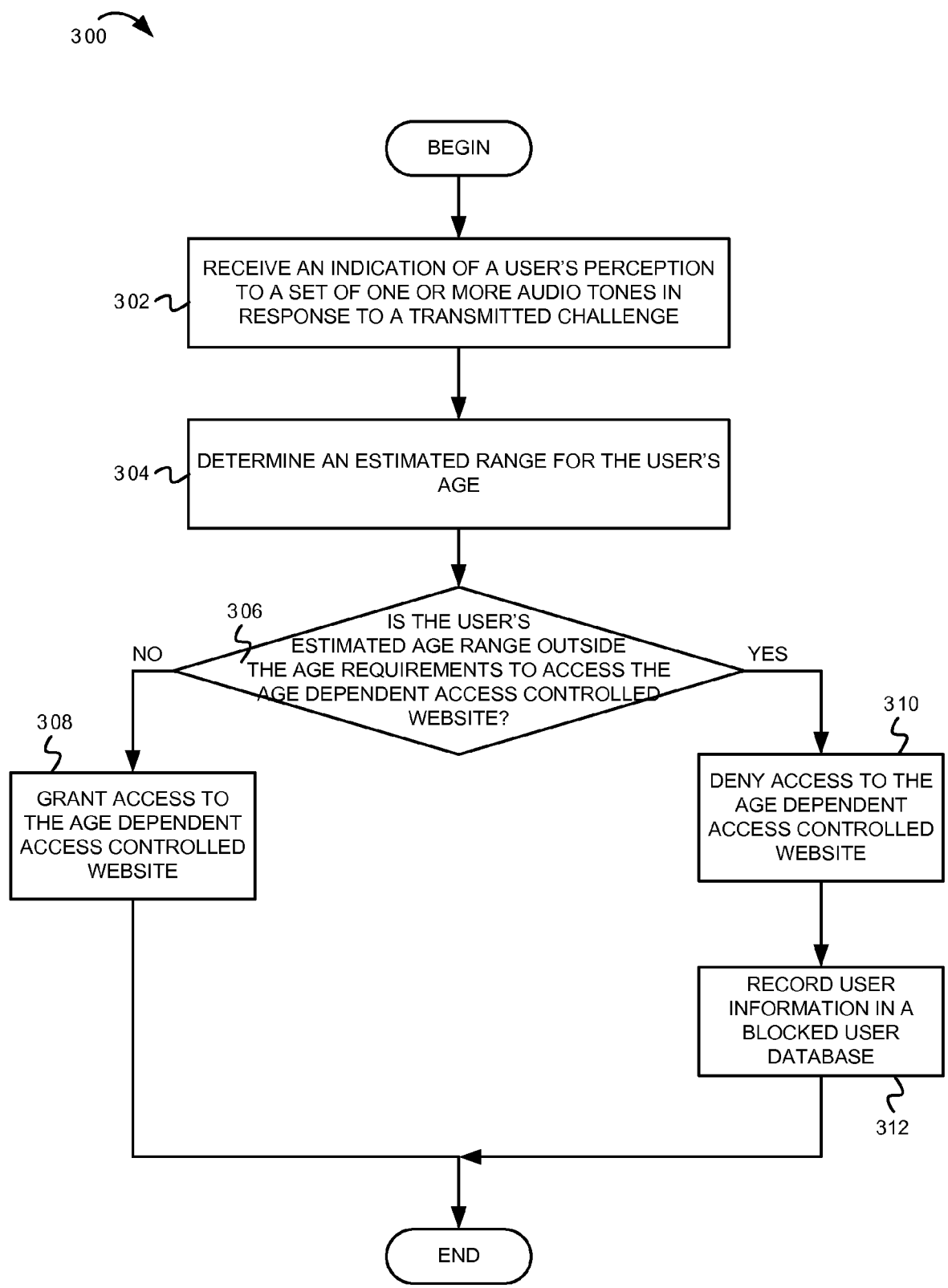
FIG. 3 is a flow diagram illustrating example operations for controlling access to an age dependent access controlled website based on electronic age verification.

FIG. 3 is a flow diagram illustrating example operations for controlling access to an age dependent access controlled website based on electronic age verification. Flow 300 begins at block 302.

At block 302, a response to a challenge (e.g., the challenge presented at block 206) is received, where the response indicates a user's perception of a set of one or more audio tones. The user's client (e.g., personal computer, mobile phone, etc.) may or may not implement functionality to identify the audio tones perceived by the user. A client plug-in may record tone information (e.g., tone verification numbers, tone frequency, a reference to the audio tone, etc.) associated with audio tones perceived by the user and transmit the recorded tone information to a server. In other implementations, the client may generate and transmit, to the server, an event with a time stamp every time the user indicates a perception of the audio tones. For example, the client may transmit an "audio started" event and indicate a time instant at which the audio file comprising the audio tones started playing. The client may then transmit one or more "tone identified" events and indicate time instants at which the user indicated a perception of the audio tones. Finally, the client may transmit an "end of audio file" event.

In some implementations, the server may direct the web browser or client plug-in to generate a tone information file (e.g., comprising tone identification numbers, tone frequencies, the time instants, etc.) indicating, either implicitly or explicitly, the perceived audio tones. Additionally, the response to the challenge may comprise information identifying the user such as the user's network address, computer serial identification number, user login name, etc. If the user accesses age dependent access controlled information via a mobile phone, a mobile phone number and a mobile phone serial identification number may also be included in the response to the challenge. The flow continues at block 304.

At block 304, an estimated range of the user's age is determined. The server can use the challenge response received at block 302 to estimate the range of the user's age. For example, the server may identify one or more audio tones perceived by the user, based on received events and time instants (described with reference to block 302). The server may determine an age range to which the user belongs, based on knowledge of the tone frequencies perceived by the user. For example, humans below the age of 49 may be able to perceive audio tones at 14 KHz, humans below the age of 30 may be able to perceive audio tones at 16 KHz, while only humans below the age of 18 may be able to perceive audio tones at 20 KHz. Thus, if the user was unable to identify audio tones at 20 KHz and 16 KHz but was able to identify audio tones at 14 KHz, it may be estimated that the user's age lies between 30 and 49 years. The flow continues at block 306.

At block 306, it is determined whether the user's estimated age range is outside age requirements to access the age dependent access controlled website. The user's estimated age range may be used to determine whether the user is eligible to access the age dependent access controlled website. Parts of websites, message forums, discussion boards, virtual worlds, online game sites, online businesses and stores, and other such web applications may also configure and enforce age restrictions. For example, an online forum for the elderly may want to block access to people below the age of 50. As another example, an online game website may want to prevent users below the age of 25 from playing online games. As another example, access to a virtual world island may be restricted to users between the ages of 30 and 45. If it is determined that the user's estimated age is outside the age requirements to access the age dependent access controlled website, the flow continues at block 308. Otherwise, the flow continues at block 310.

At block 308, access to the age dependent access controlled website is granted. In some implementations, user information may be stored in a permitted user database. For example, an IP address of the age dependent access controlled website and the user's login name may be stored in the permitted user database. User access to the age dependent access controlled website may be granted, without age verification, if the user logs into the age dependent access controlled website using the stored login name. In other implementations, every access to the age dependent access controlled website may be subject to age verification irrespective of whether the user has logged in successfully in the past. From block 308, the flow ends.

At block 310, access to the age dependent access controlled website is denied. In some implementations, the user may be presented with a new challenge comprising a new set of audio tones. The server may prompt the user to respond to the new challenge by indicating a perception of the new set of audio tones in an attempt to verify the user's age. The flow continues at block 312.

At block 312, information associated with the user is stored in a blocked user database. A network address of the age dependent access controlled website may be stored along with user information such as a login name and a device serial number (e.g., a mobile phone serial number, laptop serial number, etc). In some implementations, the blocked user database may also comprise an indicator (e.g., a counter variable) denoting a number of consecutive denied requests to access the age dependent access controlled website. If the user exceeds an allowable number of consecutive denied requests, the user's account to access the age dependent access controlled website may be closed. In other implementations, the user may be flagged if the user exceeds the allowable number of consecutive denied requests. For example, if a child tries to purchase alcohol via a restricted alcohol website, the child's parents may be notified. From block 312, the flow ends.

It should be noted that the flow diagrams described in FIG. 2-3 are examples meant to aid in understanding embodiments, and should not be used to limit embodiments or limit scope of the claims. Embodiments may perform additional operations, fewer operations, operations in a different order, operations in parallel, and some operations differently. For example, although FIGS. 2-3 describe operations for verifying the user's age to control access to an age dependent access controlled website, the operations are not restricted to websites. In some implementations, virtual worlds, gaming networks, and mobile phones may implement operations for age verification. For example, a mobile phone base station or a PSTN central office may perform age verification operations before establishing a voice communication channel between a caller and a recipient. As another example, age verification operations may be performed by the recipient (e.g., before phone based transactions are carried out) after a voice communication channel is established. As another example, entry into certain geographic regions of a virtual world may be age-restricted. Avatars in the virtual world may be granted access to the age-restricted geographic regions based on an accurate perception of the audio tones.

In some implementations, operations for age verification may not be performed on a server (e.g., the server hosting an online game, a virtual world, or a web application). Instead, the operations for age verification may be implemented on a client (e.g., a personal computer, a mobile phone, etc). For example, teenage users may configure their instant messaging clients to verify that unknown users who contact them are below the age of eighteen. As another example, users may configure their mobile phones to block voice communications and text messages from teenagers. As another example, users may also configure their email clients to block e-mail messages from users outside a specified age group.

Also, in some implementations, operations for age verification based on the perception of audio tones may not be implemented via a network (e.g., a virtual world network, the Internet, a mobile phone network, etc). Instead, audio-based age verification may be implemented on a handheld or stationary device. For example, an age verification device implementing functionality described in accordance with FIGS. 2-3 may be installed by an entrance to an age-restricted area (e.g., an alcohol shop, an elevator to a conference room, an adult movie, etc). Access to the age restricted area may be controlled based on the user's accurate perception of the audio tones. For example, the user may listen to a set of audio tones through a set of headphones and press a button to indicate perception of distinct audio tones. The elevator door or entrance to the movie may be opened, e.g., by the age verification device, only after the user correctly perceives the requisite audio tones.

Figure 4:
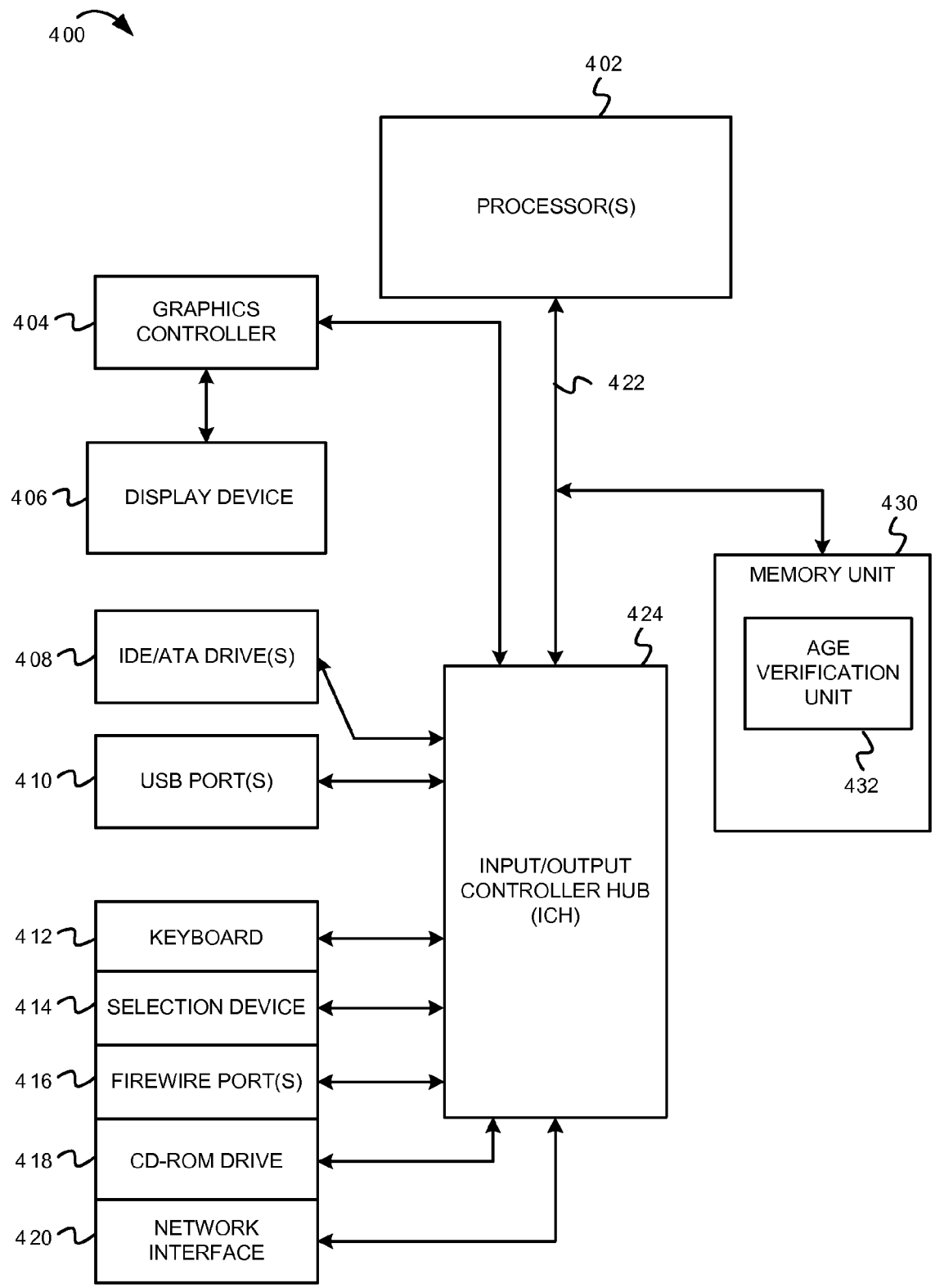
FIG. 4 is an example computer system configured to control access to age dependent access controlled information based on electronic age verification.

FIG. 4 is an example computer system configured to control access to age dependent access controlled information based on electronic age verification. The computer system 400 includes a processor 402. The processor 402 is connected to an input/output controller hub 424 (ICH), also known as a south bridge, via a bus 422 (e.g., PCI, ISA, PCI-Express, HyperTransport, etc). A memory unit 430 interfaces with the processor 402 and the ICH 424. The main memory unit 430 can include any suitable random access memory (RAM), such as static RAM, dynamic RAM, synchronous dynamic RAM, extended data output RAM, etc.

The memory unit 430 comprises an age verification unit 432. The age verification unit 432 embodies functionality to implement embodiments described in accordance with FIGS. 1-3. The age verification unit 432 implements functionality to control access to age dependent access controlled information on an age dependent access controlled application, service, or communication environment based on an end user's perception of a set of one or more audio tones. The age verification unit 432 selects the set of audio tones based on age requirements associated with the age dependent access controlled information and presents the one or more audio tones on an age verification console. The age verification unit 432 receives the user's indicated perception of the set of audio tones. Based on the frequency of audio tones perceived by the user, the age verification unit 432 calculates the user's approximate age (or a range of age). The age verification unit 432 grants or blocks access to the age dependent access controlled information depending on whether the user's approximate age lies within age requirements associated with the age dependent access controlled information.

The ICH 424 connects and controls peripheral devices. In FIG. 4, the ICH 424 is connected to IDE/ATA drives 408 (used to connect external storage devices) and to universal serial bus (USB) ports 410. The ICH 424 may also be connected to a keyboard 412, a selection device 414, firewire ports 416, CD-ROM drive 418, a network interface 420, and a graphics controller 404. The graphics controller 404 is connected to a display device 406 (e.g., monitor). In some embodiments, the computer system 400 can include additional devices and/or more than one of each component shown in FIG. 4 (e.g., video cards, audio cards, peripheral devices, etc.). For example, in some instances, the computer system 400 may include multiple processors, multiple cores, multiple external CPU's. In other instances, components may be integrated or subdivided.

Figure 5:
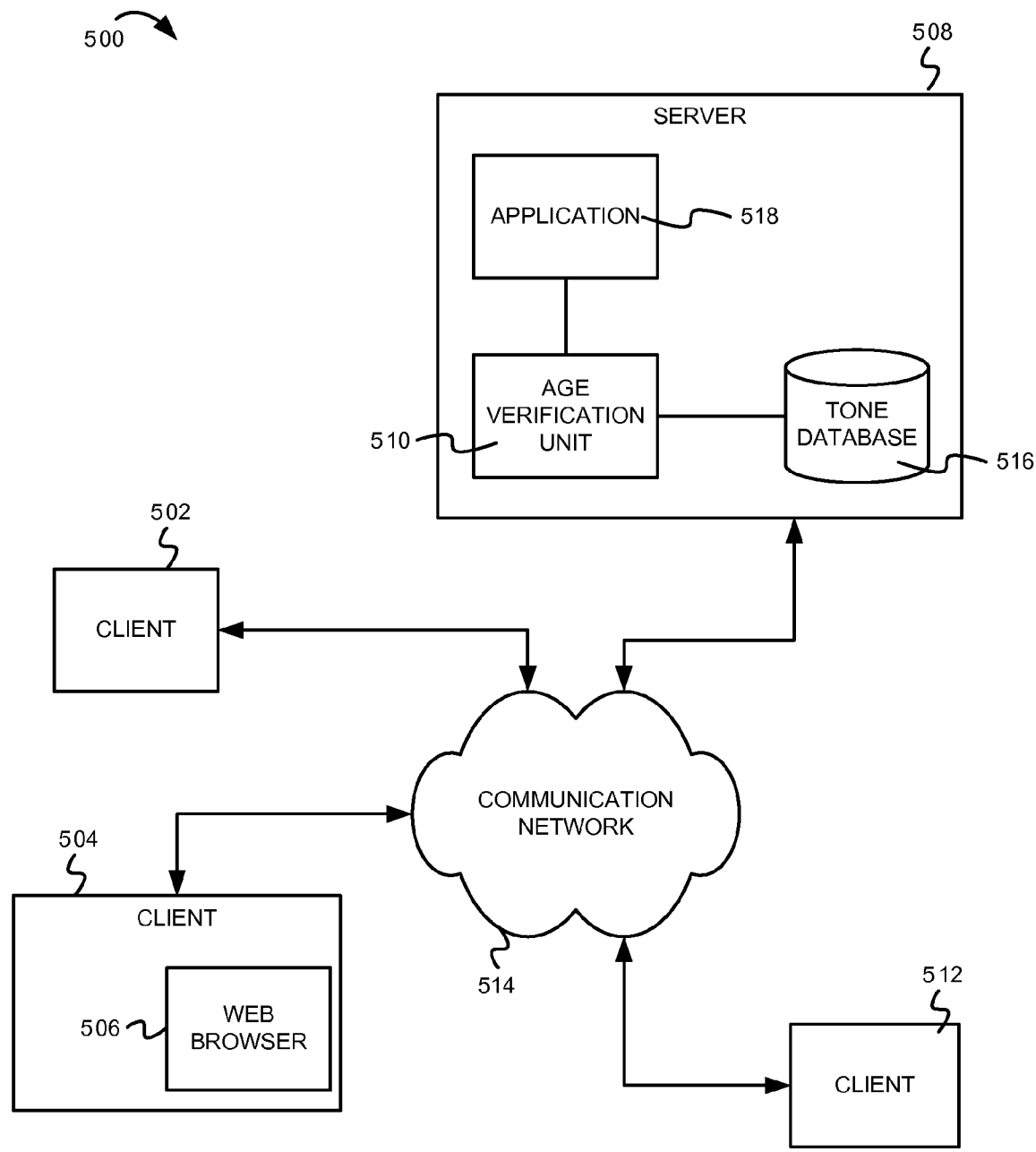
FIG. 5 is an example block diagram depicting a system configured for electronic age verification based on audio tone perception.

FIG. 5 is an example block diagram depicting a system configured for electronic age verification based on audio tone perception. The system 500 comprises a server 508 and clients 502, 504, and 512. The server 508 comprises an age verification unit 510 coupled with a tone database 516. The server 508 also hosts an application 518. The clients 502, 504, and 512 comprise a web browser 506. Any one of the server 508 and the clients 502, 504, and 512 can be embodied as the computer system 400 of FIG. 4.

The application 518 comprises age dependent access controlled information and the age verification unit 510 controls access to the application 518. The age verification unit 510 receives a request to access the age dependent access controlled application 518 from the web browser 506. The age verification unit 510 selects one or more audio tones from the tone database 516 and presents, on the web browser 506, an audio file comprising the selected audio tones. The web browser 506 records indications (e.g., tone identification numbers, time instants, etc.) of the user's perception of one or more of the audio tones and transmits the recorded indications to the age verification unit 510. Based on the frequency of the audio tones perceived by the user, the age verification unit 510 estimates the user's approximate age or an age range (i.e., a set of one or more years of human age) to which the user belongs. The age verification unit 510 grants access to the age dependent access controlled application 518 if the user's approximate age conforms to age requirements associated with the application 518.

The server 508 and the clients 502, 504, and 512 communicate via a communication network 514. The communication network 514 can include any technology suitable for passing communication between the server 508 and the clients 502, 504, and 512 (e.g., Ethernet, 802.11n, SONET, etc). Moreover, the communication network 514 can be part of other networks, such as cellular telephone networks, public-switched telephone networks (PSTN), cable television networks, etc. Additionally, the server 508 and the clients 502, 504, and 512 can be any suitable devices capable of executing software in accordance with the embodiments described herein. The clients 502, 504, and 512 may be any one of a mobile phone, a personal computer, a landline phone, or other electronic devices capable of presenting information, sending communications, and/or receiving communications. Any one or more of a server hosting a web application, a gaming server, a virtual world server, etc. may implement age verification operations. Communication routers (e.g., a mobile phone base station, a PSTN central office, intermediate network routers, etc.) may also implement the age verification operations.

In some implementations, the client 502, 504, and 512 may comprise the age verification unit 510 to control access to local resources or control communication received from other clients based on pre-defined age requirements. In other implementations, the client 502, 504, and 512 may comprise an age verification unit client plug-in to share computational, data transfer, and data processing load with the server 508. The age verification unit 510 may be implemented as a chip, plug-in, code in memory, etc.

Embodiments may take the form of an entirely hardware embodiment, a software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing ("machine-readable storage medium") or transmitting "machine-readable signal medium") information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in a machine-readable signal medium, such as an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

While the embodiments are described with reference to various implementations and exploitations, it will be understood that these embodiments are illustrative and that the scope of the inventive subject matter is not limited to them. In general, techniques for frequency based age determination as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   detecting a request to access an age dependent access controlled resource hosted by at least one server, wherein access to the age dependent access controlled resource is restricted to users within a permitted age range;
   retrieving at least a first audio tone indicated as perceivable by people within a first age range and at least a second audio tone indicated as perceivable by people within a second age range, wherein indicated perceivable age ranges of the first audio tone and the second audio tone are mutually exclusive;
   presenting, on a device, at least both of the first audio tone and the second audio;
   determining an estimated age range based on a response that indicates which of the first audio tone and the second audio tone could not be perceived in response to said presenting the at least both of the first audio tone and the second audio tone on the device, wherein said determining the age range based on the response that indicates which of the first audio tone and the second audio tone could not be perceived comprises:
      generating an indication in response to a perception of a perceived audio tone of the first audio tone and the second audio tone;
      recording tone information associated with the perceived audio tone, wherein the tone information is one or more of an audio tone identification number, an audio tone frequency, a time instant at which the audio tone was perceived, and a reference to the perceived audio tone; and transmitting the tone information associated with the perceived audio tone to the at least one server hosting the age dependent access controlled resource;

denying the request to access the age dependent access controlled resource hosted by the at least one server based on the estimated age range being outside of the permitted age range.

2. The method of claim 1, wherein the age dependent access controlled resource comprises at least one of an online communication environment, a chat room, a message board, a virtual world, a part of a virtual world, an online game, an online social network, a website, an Internet based application, and a phone-based application.

3. The method of claim 1, further comprising the at least one server storing, in a blocked user database, identification information associated with the denied request to access the age dependent access controlled resource, wherein the identification information comprises one or more of an Internet Protocol address associated with the age dependent access controlled resource, a client network address, a client device serial number, an identification number associated with a client account to access the age dependent access controlled resource, and a number of consecutive denied requests to access the age dependent access controlled resource.

4. The method of claim 1, further comprising:
determining that a second request to access the age dependent access controlled resource hosted by the at least one server is denied;
determining that a number of consecutive denied requests to access the age dependent access controlled resource exceeds a number of allowable consecutive denied requests; and
closing a client account used to access the age dependent access controlled resource.

5. The method of claim 1, further comprising:
detecting a second request to access the age dependent access controlled resource on the at least one server;
retrieving at least both of the first audio tone and the second audio tone;
presenting, on the device, at least both of the first audio tone and the second audio tone;
determining a second estimated age range based on receiving a response indicating which of the first audio tone and the second audio tone was perceived in response to said presenting at least both of the first audio tone and the second audio tone on the device;
comparing the second estimated age range with the permitted age range associated with the age dependent access controlled resource;
determining that the second estimated age range conforms to the permitted age range; and
granting the second request to access the age dependent access controlled resource based, at least in part, on the determining that the second estimated age range conforms to the permitted age range.

6. The method of claim 1, wherein said presenting, on the device, the at least both of the first audio tone and the second audio tone comprises presenting the at least both of the first audio tone and the second audio tone in an increasing order of audio frequency.

7. The method of claim 1, wherein said presenting, on the device, the at least both of the first audio tone and the second audio tone comprises presenting the at least both of the first audio tone and the second audio tone in a varying order of audio frequencies.

8. One or more machine-readable storage media having stored therein a program product, which when executed by a set of one or more processors causes the set of one or more processors to perform operations that comprise:
detecting a request to access an age dependent access controlled resource hosted by at least one server, wherein access to the age dependent access controlled resource is restricted to users within a permitted age range;
retrieving at least a first audio tone indicated as perceivable by people within a first age range and at least a second audio tone indicated as perceivable by people within a second age range, wherein indicated perceivable age ranges of the first audio tone and the second audio tone are mutually exclusive;
presenting at least both of the first audio tone and the second audio tone;
determining an estimated age range based on a response that indicates which of the first audio tone and the second audio tone could not be perceived in response to presentation of the at least both of the first audio tone and the second audio tone on the device, wherein the operation of determining the age range based on the response that indicates which of the first audio tone and the second audio tone could not be perceived comprises:
generating an indication in response to a perception of a perceived audio tone of the first audio tone and the second audio tone;
recording tone information associated with the perceived audio tone, wherein the tone information is one or more of an audio tone identification number, an audio tone frequency, a time instant at which the audio tone was perceived, and a reference to the perceived audio tone; and
transmitting the tone information associated with the perceived audio tone to the at least one server hosting the age dependent access controlled resource; and
denying the request to access the age dependent access controlled resource hosted by the at least one server based on the estimated age range being outside of the permitted age range.

9. The one or more machine-readable storage media of claim 8,
wherein the age dependent access controlled resource comprises at least one of an online communication environment, a chat room, a message board, a virtual world, a part of a virtual world, an online game, an online social network, a website, an Internet based application, and a phone-based application.

10. The one or more machine-readable storage media of claim 8,
wherein the operations further comprise:
determining that a second request to access the age dependent access controlled resource hosted by the at least one server is denied;
determining that a number of consecutive denied requests to access the age dependent access controlled resource exceeds a number of allowable consecutive denied requests; and
closing a client account used to access the age dependent access controlled resource.

11. The one or more machine-readable storage media of claim 8,
wherein the operations further comprise:

detecting a second request to access the age dependent access controlled resource on the at least one server;

retrieving at least both of the first audio tone and the second audio tone;

presenting, on the device, at least both of the first audio tone and the second audio tone;

determining a second estimated age range based on receiving a response indicating which of the first audio tone and the second audio tone was perceived in response to said presenting at least both of the first audio tone and the second audio tone on the device;

comparing the second estimated age range with the permitted age range associated with the age dependent access controlled resource;

determining that the second estimated age range conforms to the permitted age range; and granting the second request to access the age dependent access controlled resource based, at least in part, on the determining that the second estimated age range conforms to the permitted age range.

12. An apparatus comprising:
a processor;
a memory unit coupled with the processor;
an age verification unit configured to:
 detect a request to access an age dependent access controlled resource hosted by at least one server, wherein access to the age dependent access controlled resource is restricted to users within a permitted age range;
 retrieve at least a first audio tone indicated as perceivable by people within a first age range and at least a second audio tone indicated as perceivable by people within a second age range, wherein indicated perceivable age ranges of the first audio tone and the second audio tone are mutually exclusive;
 present at least both of the first audio tone and the second audio tone;
 determine an estimated age range based on a response that indicates which of the first audio tone and the second audio tone could not be perceived in response to the age verification unit presenting the at least both of the first audio tone and the at least the second audio tone on the device, wherein the age verification unit being operable to determine the age range based on the response that indicates which of the first audio tone and the second audio tone could not be perceived comprises the age verification unit being operable to,
  generate an indication of perception of a perceived audio tone of the first audio tone and the second audio tone;
  record tone information associated with the perceived audio tone, wherein the tone information is one or more of an audio tone identification number, an audio tone frequency, a time instant at which the audio tone was perceived, and a reference to the perceived audio tone; and
  transmit the tone information associated with the perceived audio tone to the at least one server hosting the age dependent access controlled resource; and
 deny the request to access the age dependent access controlled resource hosted by the at least one server based on the estimated age range being outside of the permitted age range.

13. The apparatus of claim 12, wherein the age verification unit comprises one or more machine-readable storage media.

* * * * *